G. J. GENUNG.
TEST INDICATOR.
APPLICATION FILED JULY 19, 1920.
1,391,731.
Patented Sept. 27, 1921.
3 SHEETS—SHEET 1.
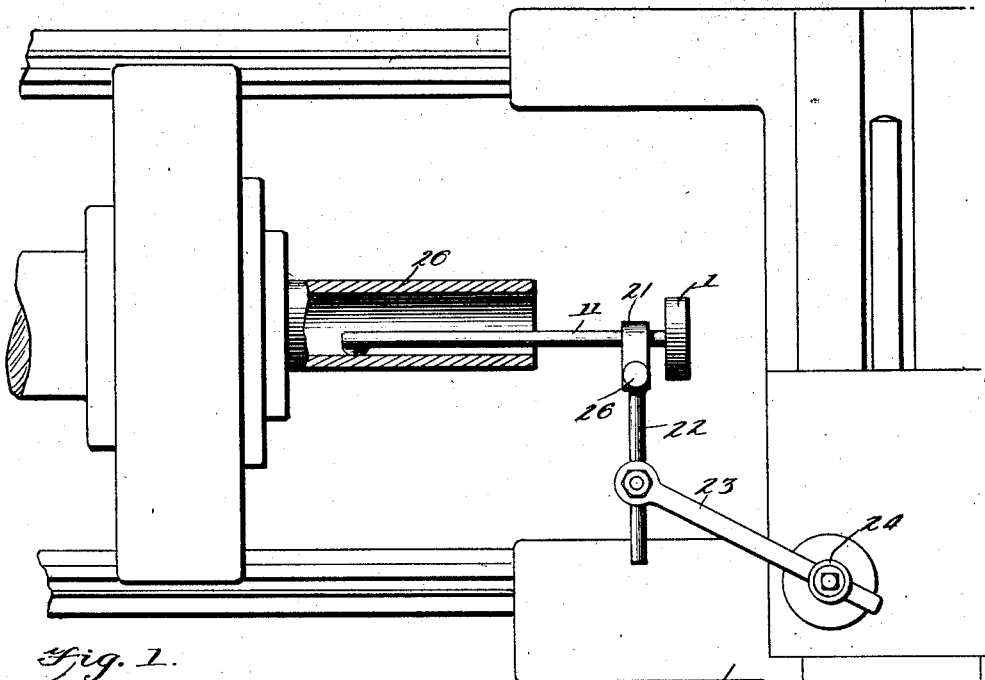
Fig. 1.
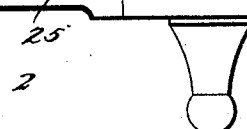
Fig. 2.
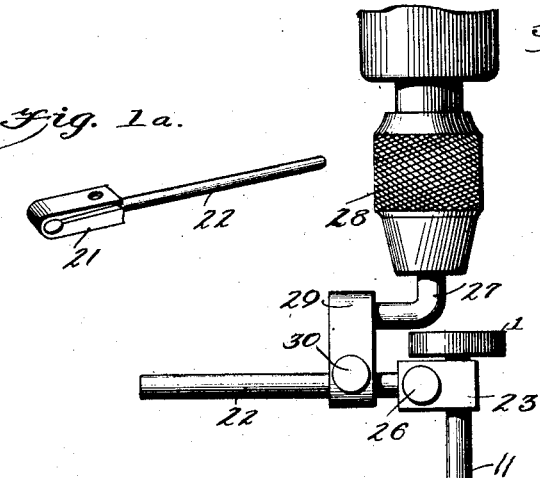
Fig. 1a.
Fig. 3.
WITNESSES
INVENTOR
G. J. Genung,
BY
ATTORNEYS

G. J. GENUNG.
TEST INDICATOR.
APPLICATION FILED JULY 19, 1920.

1,391,731. Patented Sept. 27, 1921.
3 SHEETS—SHEET 2.

WITNESSES

INVENTOR
G. J. Genung,
BY
ATTORNEYS

G. J. GENUNG.
TEST INDICATOR.
APPLICATION FILED JULY 19, 1920.
1,391,731.
Patented Sept. 27, 1921.
3 SHEETS—SHEET 3.
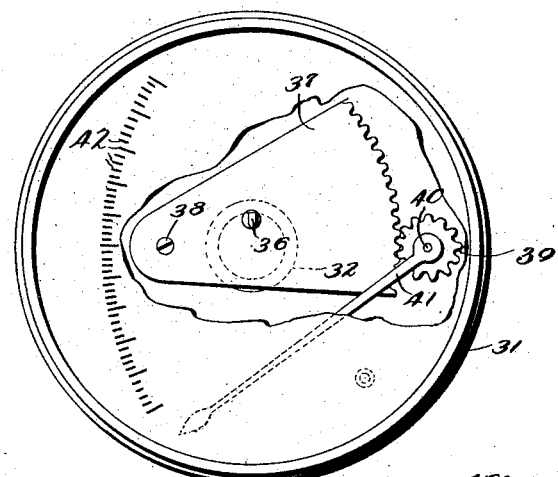
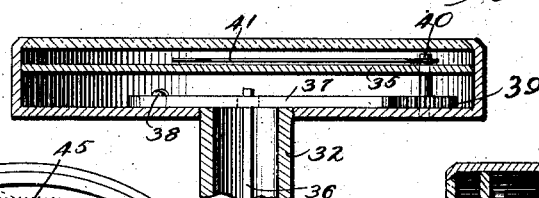
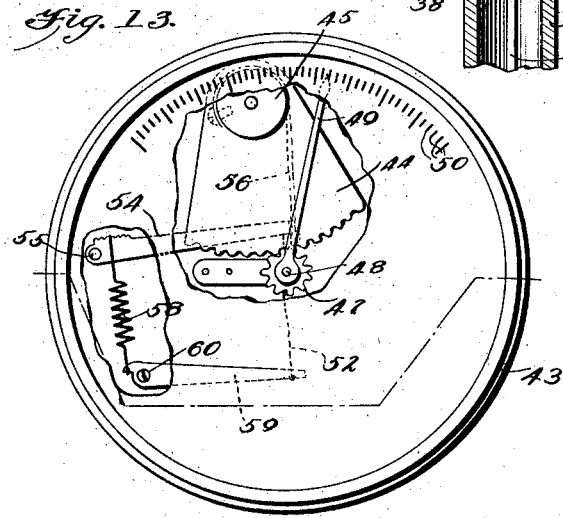
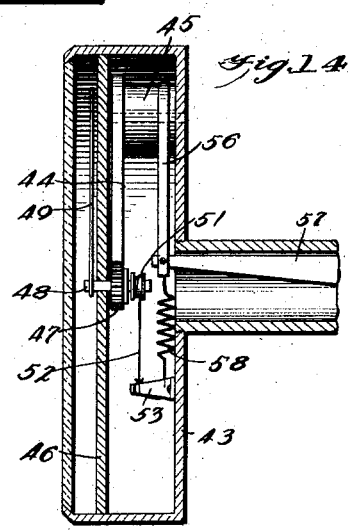
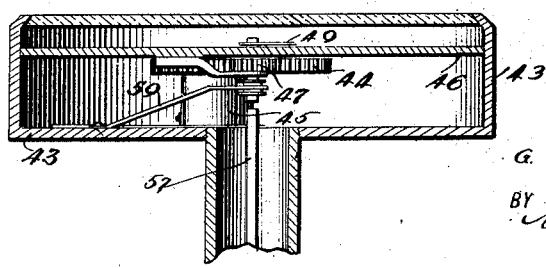
WITNESSES
INVENTOR
G. J. Genung,
BY
ATTORNEYS

UNITED STATES PATENT OFFICE.

GEORGE JOSEPH GENUNG, OF BEAVER FALLS, PENNSYLVANIA, ASSIGNOR OF ONE-HALF TO WALTER G. KLEIN, OF BEAVER FALLS, PENNSYLVANIA.

TEST-INDICATOR.

1,391,731. Specification of Letters Patent. Patented Sept. 27, 1921.

Application filed July 19, 1920. Serial No. 397,159.

*To all whom it may concern:*

Be it known that I, GEORGE JOSEPH GENUNG, a citizen of the United States, and a resident of Beaver Falls, in the county of Beaver and State of Pennsylvania, have invented certain new and useful Improvements in Test-Indicators, of which the following is a specification.

My invention is an improvement in test indicators, and has for its object to provide a device of the character specified, for permitting the accuracy of surfaces to be determined, wherein small openings of considerable depth may be measured.

In the drawings:

Figure 1 is a top plan view of a portion of a lathe, with parts in section, showing the manner of using the indicator;

Fig. 1ª is a perspective of a holder arm embodied in the invention.

Fig. 2 is a side view, showing another method of using the indicator;

Fig. 3 is a perspective view of one of the connections;

Fig. 11 is a plan view of another embodiment of the invention with a part of the top broken away;

Fig. 12 is a vertical section;

Fig. 13 is a view similar to Fig. 12 of another modification; and

Figs. 14 and 15 are sections, taken at right angles to each other.

Figure 4:
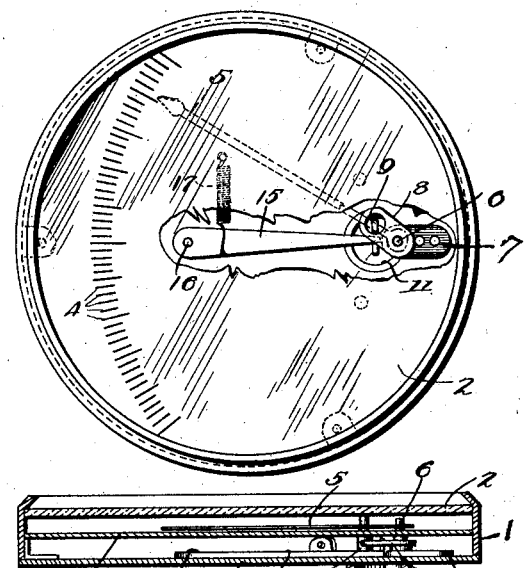
Fig. 4 is a plan view of the indicator with parts broken away.
Figure 5:
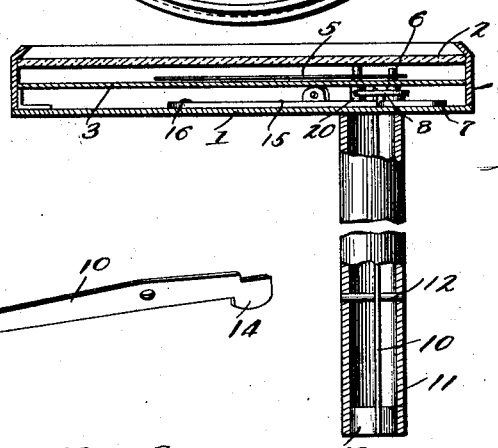
Fig. 5 is a transverse vertical section.
Figure 6:
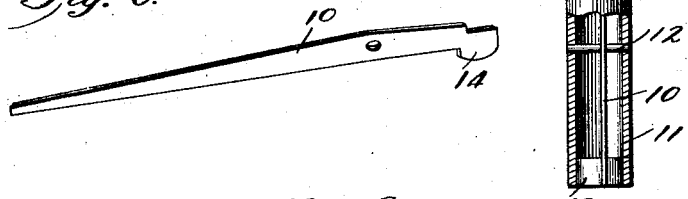
Fig. 6 is a perspective view of the controlling lever.
Figure 7:
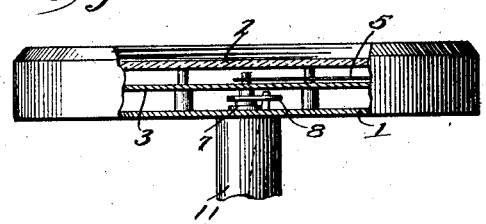
Fig. 7 is a sectional view at right angles to Fig. 5.

In the embodiment of the invention shown in Figs. 4 to 10, inclusive, the improved indicator comprises a substantially cylindrical case 1, having its top closed by a sheet 2 of transparent material, as for instance glass, and the casing has a transverse partition 3 intermediate the glass and the bottom.

Upon this plate or partition 3 there is arranged a scale indicator at 4 and an indicator hand 5 is mounted above the partition for coöperating with the scale. This indicator hand is pivoted at 6, the pivot pin 6 upon which the indicator hand is mounted extending through the partition 3 and being mounted in a bracket plate 7 on the bottom of the casing. This pivot pin 6 has a radial arm 8 extending approximately parallel with the indicator hand and the said arm has an opening 9 at its free end of relatively large diameter. This opening is engaged by one end of a lever 10 which is mounted in a manner to be presently described, the said lever being pivoted intermediate its ends, and it will be obvious that when the opposite end of the lever 10 is swung the arm 8 will be swung, carrying with it the indicator hand 5.

The lever 10 is pivoted in a tubular extension 11, which extends from the case 1 eccentrically and adjacent to the pivot pin 6. The lever is pivoted on a cross pin 12 which is nearer the lower end of the extension 11 than the upper end. The lower end of this extension 11 is plugged as shown, by a plug 13, and the plug and the extension are slotted, to permit a laterally extending lug 14 on the lower end of the lever 10 to extend beyond the pivotal surface of the casing 11, as shown in Figs. 1 and 2, so that such lug may engage the work.

The indicator hand 5 is normally pressed toward the top of the sheet, as shown in broken lines in Fig. 4, by means of a lever 15. This lever is pivoted at 16, to the bottom of the case, and the free end of the lever 15 engages the upper end of the lever 10, and normally presses toward the top of Fig. 4 that is in the direction to throw the indicator arm into the dotted line position of Fig. 4.

A coil spring 17 is arranged between the bottom of the case and the lever 15, for normally drawing the arm 15 in the direction above described, and this spring 17 also acts to extend the lug 14 beyond the extension 11, that is the spring 17 acts normally to draw the lever 15 in a direction to swing the lever 10 to cause the lug 14 to be extended beyond the tubular extension 11.

Figure 8:
Fig. 8 is a perspective view of the pivot pin.
Figure 9:
Fig. 9 is a similar view of one of the spacing pins.
Figure 10:
Fig. 10 is a perspective view of the filling plug.

In Fig. 8 there is shown the construction of the pivot pin 6. This pin as shown consists of three portions of unequal diameter, the body portion 6 which is of smallest diameter, an enlargement 18, and an enlargement 19 of greater diameter than the enlargement 18. That end of the pin 6 adjacent to the enlargement 19 is passed through an opening in the bracket plate 7 beforementioned, with the enlargement 19 just above the bracket plate. The arm 8 has an opening for receiving the enlargement 18, and abuts the upper end of the enlargement 19. The opposite end of the pin from the enlargement 19 passes through an opening in the partition plate 3, and above the partition plate the hand 5 is secured on the pin, thus the enlargements 18 and 19 act to space the partition plate from the bottom of the casing. Pins 20 of the character shown in Fig. 9 are arranged on each side of the extension 11 for properly spacing the partition, the glass and the bottom of the case. These pins 20 have reduced ends which engage openings in the bottom of the casing and in the partition 3, respectively. The upper ends of the pins abut the under face of the glass 2.

In use the improved indicator is employed as shown in Figs. 1 and 2. In Fig. 1 the tubular extension 11 is engaged by a clamp 21 on a holder arm 22, and this arm is connected with the tool holder 23 supported by the tool post 24 of the lathe 25. The clamp 21 as shown in Fig. 1ᵃ is a split resilient clamp which may be clamped on the tool holder by means of a set screw 26.

In Fig. 1 the indicator is shown as inserted in an opening in the work 26. In Fig. 2 the indicator is shown in connection with the spindle of a drill press or boring machine. With this arrangement the holder arm 22 whose clamp 23 carries the indicator is connected to an angular pin 27 held in the chuck 28 of the drill stem by means of the clamp shown in Fig. 3. This clamp is a block 29 having openings at its ends for receiving the holder arm 22 and the angular rod 27, and a set screw 30 passes through the block into engagement with the holder arm to hold the same in adjusted position.

In Figs. 11 and 12 the casing 31 which has an extension 32, a transparent cover 33 and a partition 35, has the lever 36 corresponding with the lever 10, and this lever engages at its upper end a toothed segment 37 which is pivoted at 38 in the casing. The teeth of the segment engage the teeth of a pinion 39 which is secured to a pivot shaft 40 journaled in the partition 35 and in the bottom of the case and extending above the partition. Here an indicator arm 41 is secured to the shaft. This indicator arm coöperates with a scale 42 on the partition 35.

In the embodiment of the invention shown in Figs. 13 and 14 the case 43 which corresponds in all respects to that shown in Fig. 12 has pivoted therein a toothed sector 44, the sector being connected to a drum 45 which is mounted to rotate between the bottom of the case and the partition 46. The teeth of this sector engage the teeth of the pinion 47 secured to a shaft 48 which extends through the partition 46 and carries an indicator arm 49 coöperating with the scale 50 on the partition. A small drum 51 is secured to the shaft 48 below the pinion 47, and upon this shaft winds one end of a flexible member 52. The other end of the flexible member engages an angular lug 53 on a lever 54 which is pivoted to the bottom of the casing, as indicated at 55. A flexible member 56 is connected at one end to the lever 57 corresponding to the lever 10 of Fig. 1, and the other end of the flexible member 56 winds upon the drum 45 before mentioned. A coil spring 58 is arranged between the levers 54 and a lever 59 pivoted at 60 to the case. As shown in Fig. 13 the lever 54 has a series of notches with any one of which the spring 54 may be engaged. The operation of this embodiment of the invention is as follows:

The spring 58 acts on the lever 59 in a manner to cause the flexible member 52 to be unwound from the drum, and the spring acts on the lever 54 in a direction to cause the flexible member 56 to be unwound from the drum 45. When that end of the lever 57 which is provided with the contacting lug is pressed inward, the flexible member 56 is unwound from the drum 45 and this drum is rotated. The sector 44 will rotate the pinion 47 to swing the indicator arm 49. As soon as the pressure is relaxed on the lever 57 the spring 58 will pull on the cord 52 in a direction to return the pointer 49 to its original position. The lever 54 acts as a balance pressing forward against the long lever 57, thus relieving the excessive leverage necessary to release the contact point.

It will be noticed with reference to Figs. 4, 11 and 13 that the graduations of the scales are closer together at the center of the scale than at the ends, the space between the graduations gradually widening toward the ends of the scales. With the improved indicator the long slender extension 11 permits the operator to test or gage the entire surface of a long hole of relatively small diameter or to reach into a small opening or aperture of a jig or any other piece of machinery to be tested.

I claim:

1. In combination, a case having indicating mechanism, and having a tubular extension of relatively great length and small diameter, a lever pivoted in the extension and having an integral contact lug extending radially beyond the same at the end remote from the case, a connection between the indicating mechanism and the other end of the lever for controlling the same when the lever is moved, said indicating mechanism comprising a pointer arm pivoted to the case, the case having a scale with which the arm coöperates, an arm secured to the pointer arm and having an opening at the end remote from its connection with the pointer arm, the lever engaging the opening, and a spring normally pressing said lever lug in one direction against the work, a second lever pivoted to the case and engaging the first-named lever at its free end, the spring being arranged between the said last-named lever and the case.

2. In combination, a case having indicating mechanism, and having a tubular extension of relatively great length and small diameter, a lever pivoted in the extension and having a contact lug extending beyond the same at the end remote from the case, a connection between the indicator mechanism and the other end of the lever for controlling the same when the lever is moved, said indicating mechanism comprising a pointer arm pivoted to the case, the case having a scale with which the arm coöperates, an arm secured to the pointer arm and having an opening at the end remote from its connection with the pointer arm, the lever engaging the opening, and a spring normally pressing said lever lug in one direction toward the work.

3. In combination, indicating mechanism comprising a casing having a scale and a pointer arm mounted to swing and coöperating with the scale, said arm having extending from the same at the pivotal connection an extension arm provided with an opening, and a lever pivoted intermediate its ends to the casing and having one end engaging loosely within the opening of the extension arm, the other end being provided with a laterally extending lug for engaging the work, and the casing having an extension inclosing the lever and through which the lateral lug extends, and a spring normally pressing said lever lug toward the work.

GEORGE JOSEPH GENUNG.